United States Patent [19]

Frase et al.

[11] Patent Number: 4,496,004
[45] Date of Patent: Jan. 29, 1985

[54] REARWARDLY FOLDING AGRICULTURAL IMPLEMENT

[75] Inventors: Roland J. Frase, Roselle; Leonard A. Bettin, Lyons, both of Ill.

[73] Assignee: International Harvester Co., Chicago, Ill.

[21] Appl. No.: 373,752

[22] Filed: Apr. 30, 1982

[51] Int. Cl.$^3$ ............................................. A01B 73/00
[52] U.S. Cl. .................................... 172/311; 91/515; 172/383
[58] Field of Search ............... 172/311, 456, 466, 446, 172/776, 293, 294, 400, 401, 128, 678, 383, 386, 2, 3, 26; 56/228, 385; 91/512, 515, 517, 518, 91/527, 531, 436; 60/384

[56] References Cited

U.S. PATENT DOCUMENTS

| | | | |
|---|---|---|---|
| 3,715,572 | 2/1973 | Bennett | 172/3 X |
| 3,896,882 | 7/1975 | Frank | 172/311 |
| 3,935,696 | 2/1976 | Pavel | 56/385 |
| 3,982,773 | 9/1976 | Stufflebeam et al. | 280/656 |
| 4,042,044 | 8/1977 | Honnold | 172/311 |
| 4,088,346 | 5/1978 | Schreiner et al. | 172/311 X |
| 4,272,097 | 6/1981 | Cornelius | 172/311 X |
| 4,337,959 | 7/1982 | Bettin et al. | 172/401 X |

Primary Examiner—Richard T. Stouffer
Attorney, Agent, or Firm—Dennis K. Sullivan; F. David Au Buchon

[57] ABSTRACT

This invention teaches an improved collapsible farm implement of the type having a wheeled frame or cart and right and left side elongated toolbars pivoted at their inboard ends about vertical axes relative to the frame so as to allow toolbar rotation rearward through approximately a quarter turn between a fully elevated field use position disposed crosswise to the path of implement travel and a road transit position disposed parallel to the path of implement travel. A wheeled truck assembly is mounted near the outboard end of each toolbar for providing rolling support of the latter, and each wheeled truck assembly can be rotated relative to the toolbar about an axis disposed substantially normal to the toolbar through approximately a quarter turn operable to steer the outboard end of the toolbar, upon appropriate forward or rearward implement movement, between the respective fully elevated field use and road transit positions. To provide a compact collapsed implement, each toolbar is pivoted or rotated approximately a quarter turn about a horizontal axis disposed substantially parallel to the toolbar so as to raise and lower tool elements carried on the toolbars between a lowered, operative field use position adjacent the ground and a fully elevated field use position disposed substantially normal to the ground. Partial toolbar rotation is utilized during normal field operation to raise tool elements clear of the ground for turning at the end of field passes. A power cylinder is used to steer each wheeled truck assembly and to rotate each toolbar for raising and lowering the tool elements, and a flow divider is used to admit equal volumes of pressurized hydraulic fluid to the cylinders so that synchronized steering or tool element lift operation takes place.

29 Claims, 18 Drawing Figures

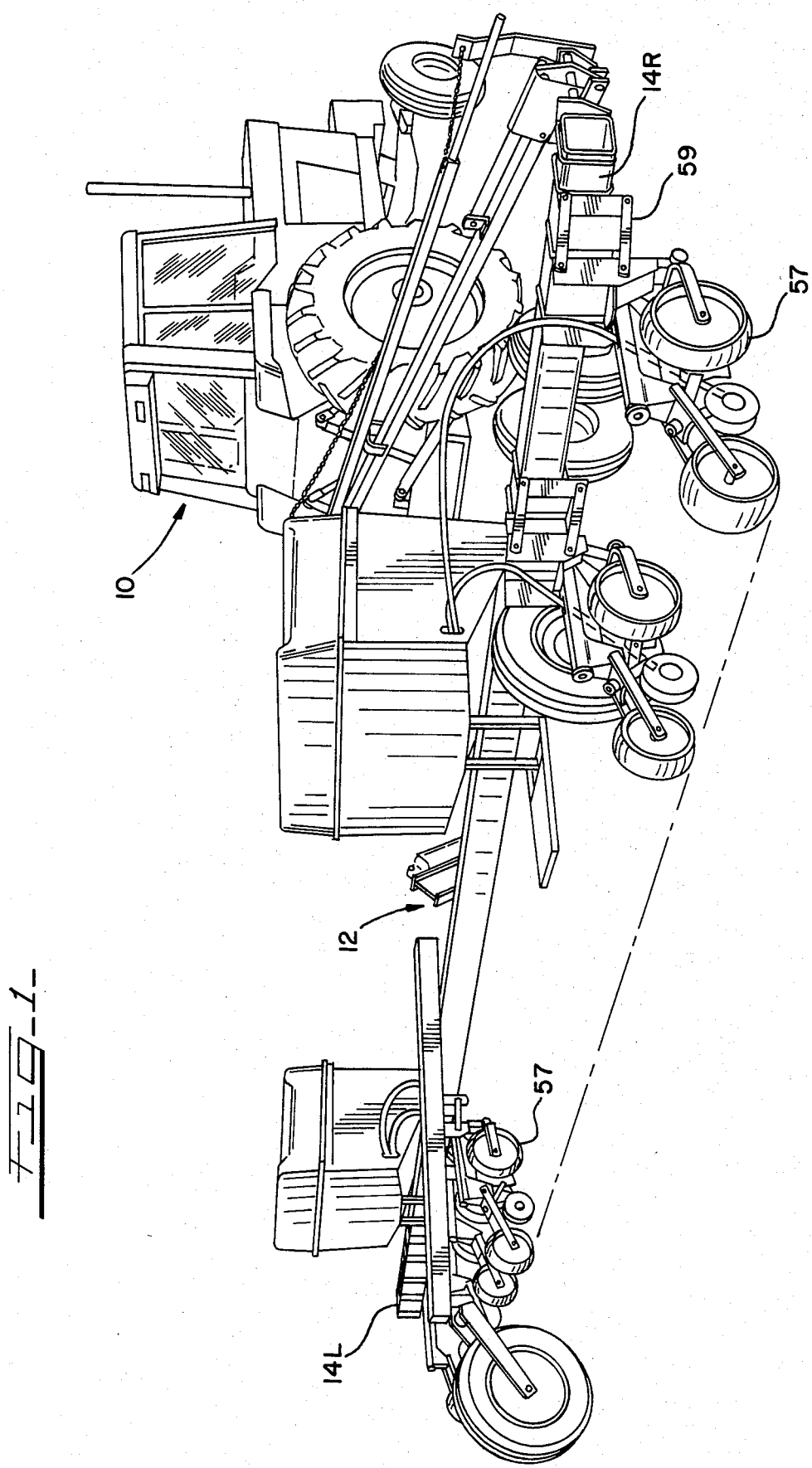

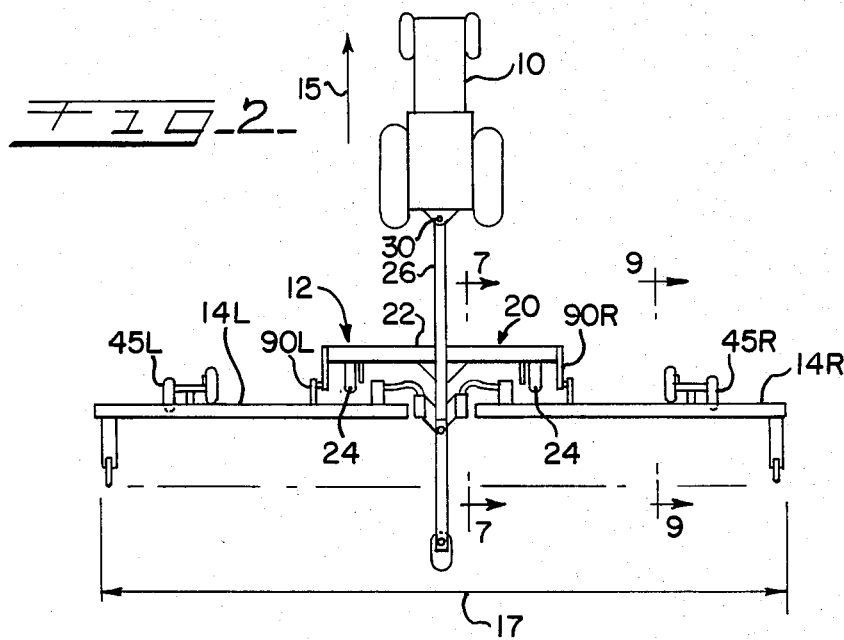
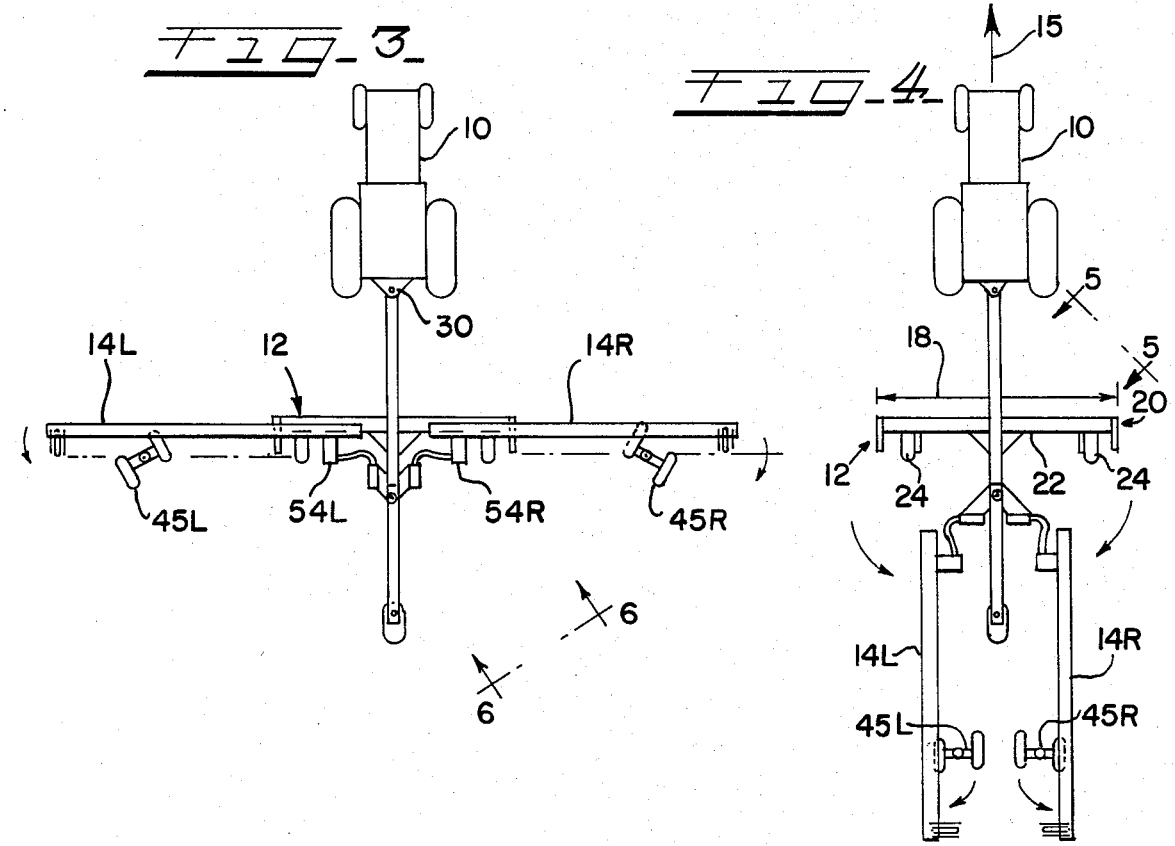

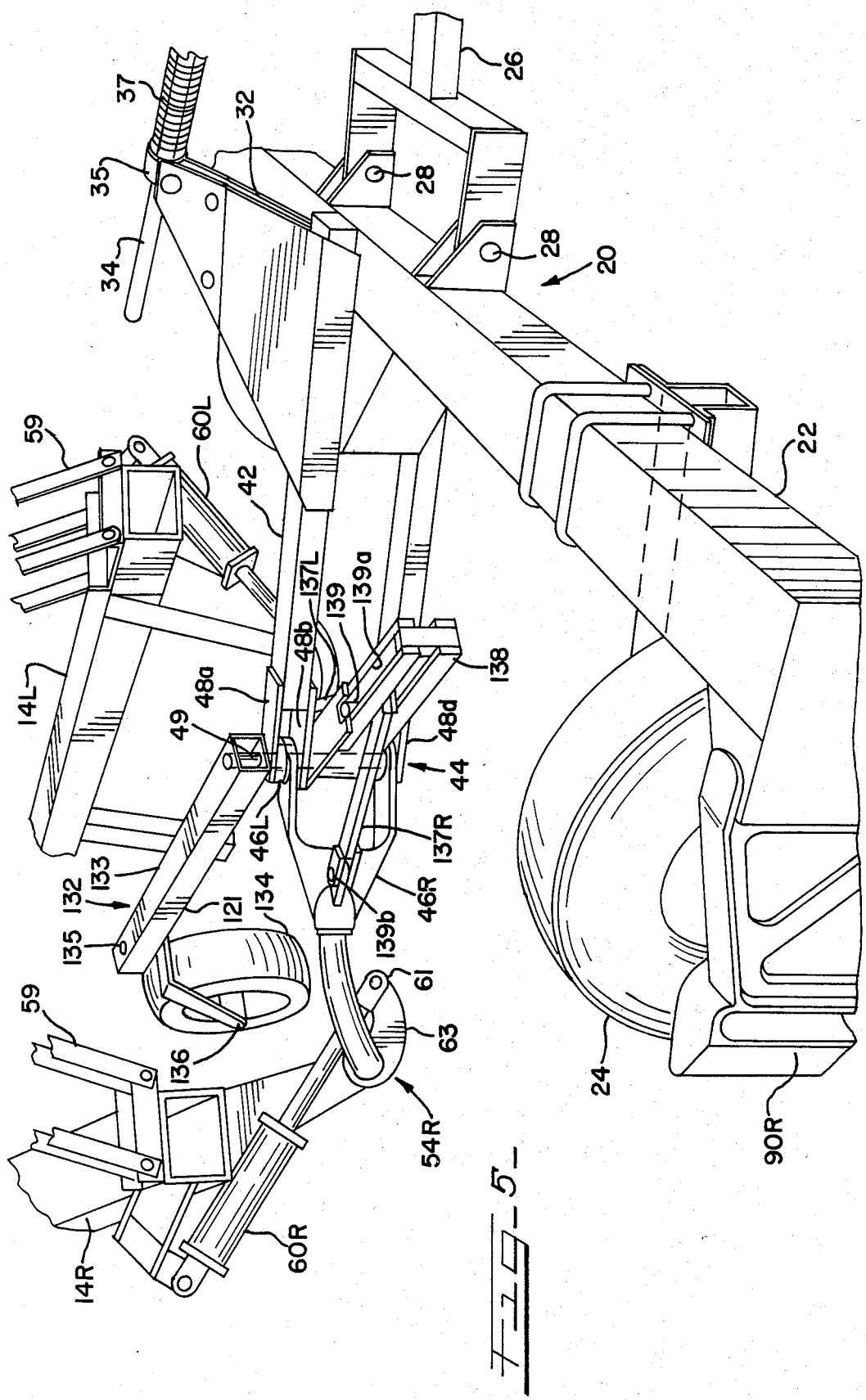

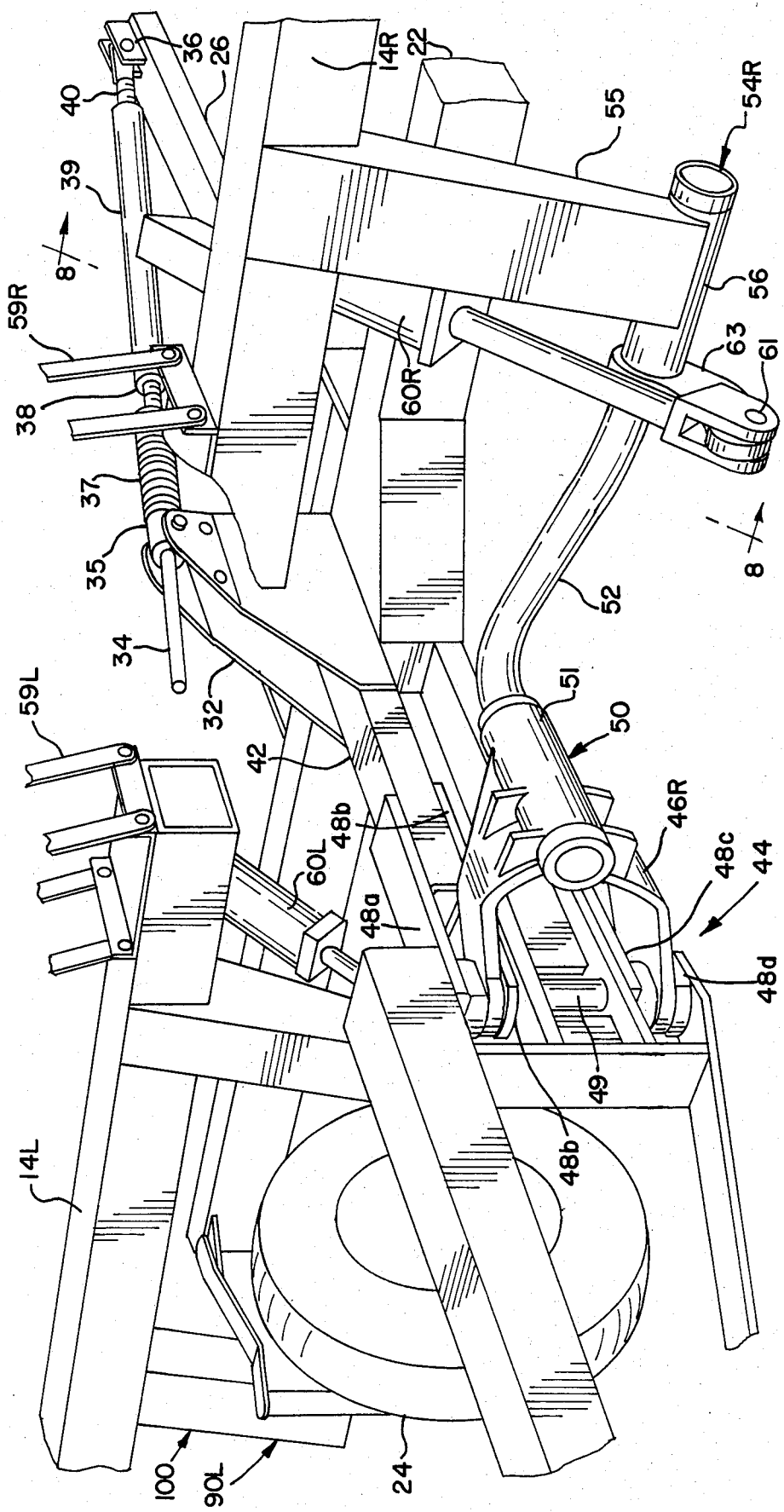

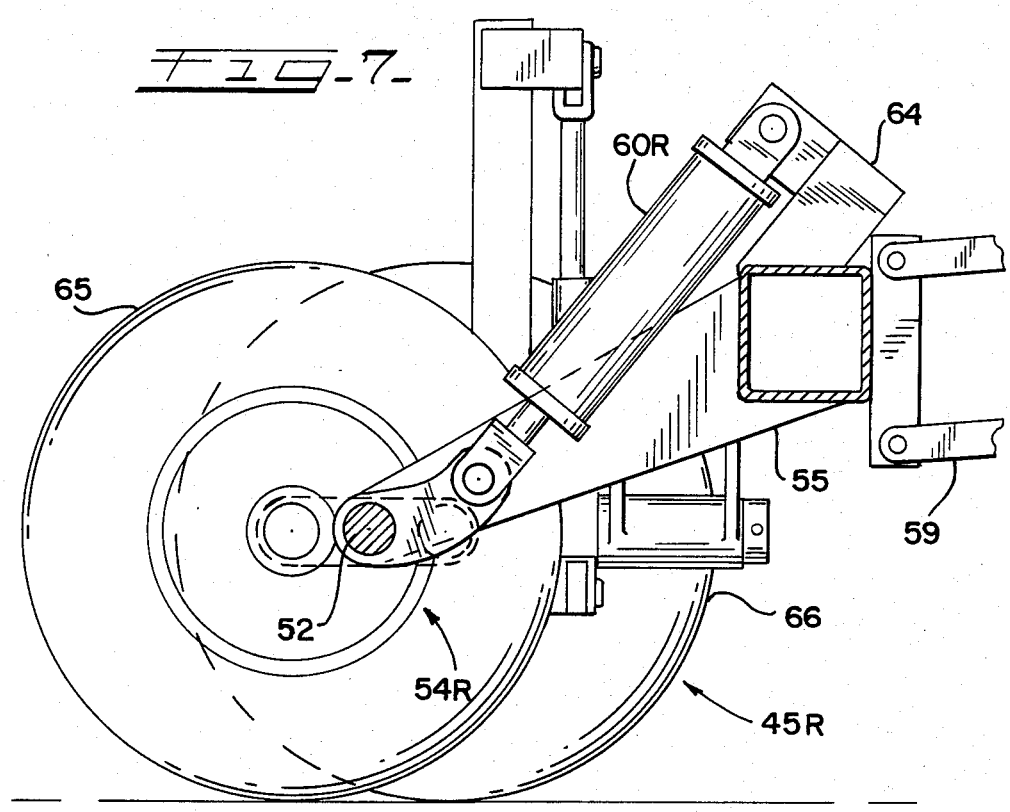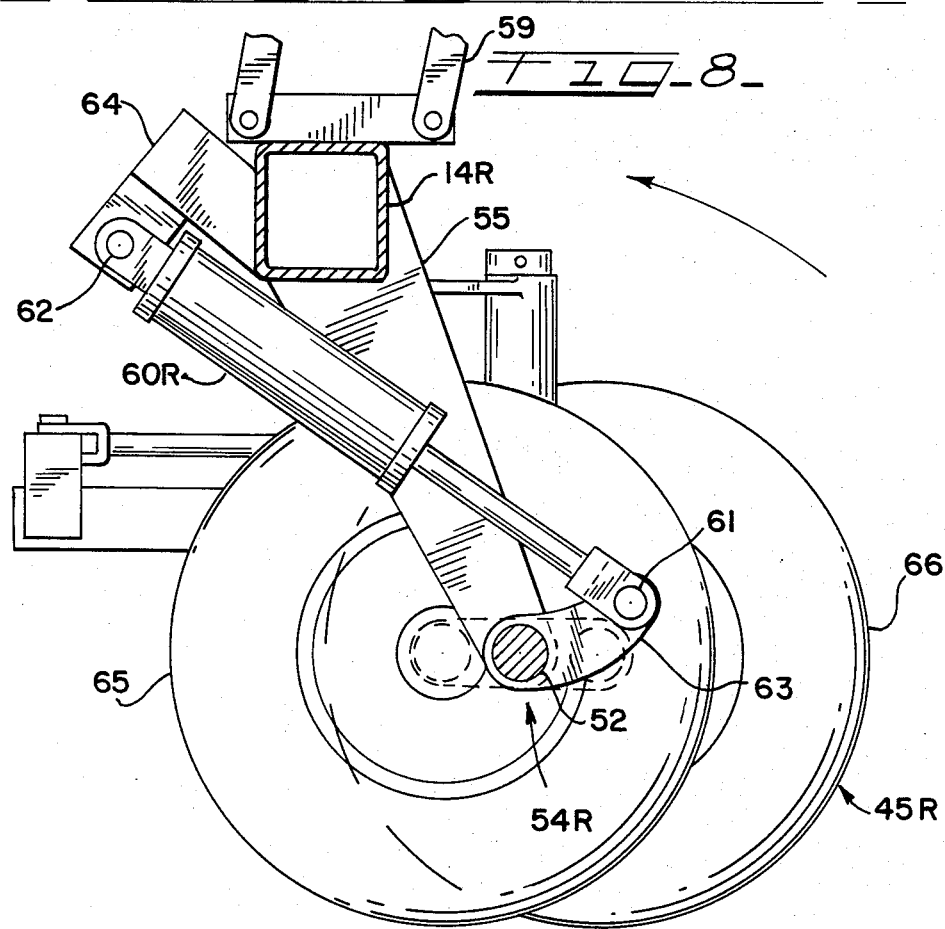

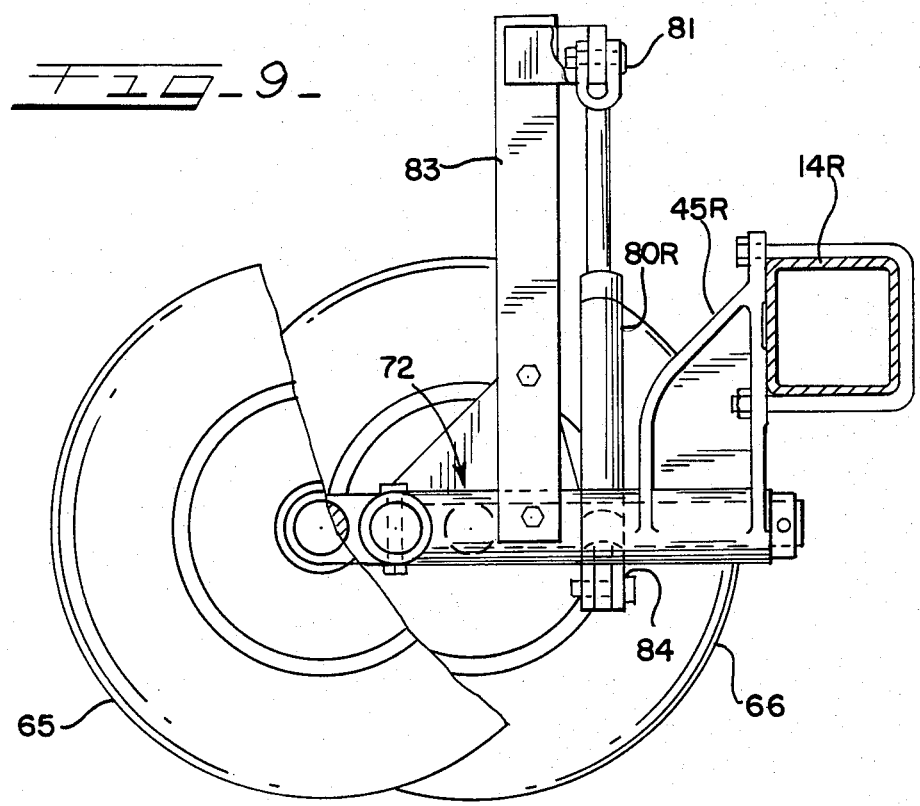
FIG_9_
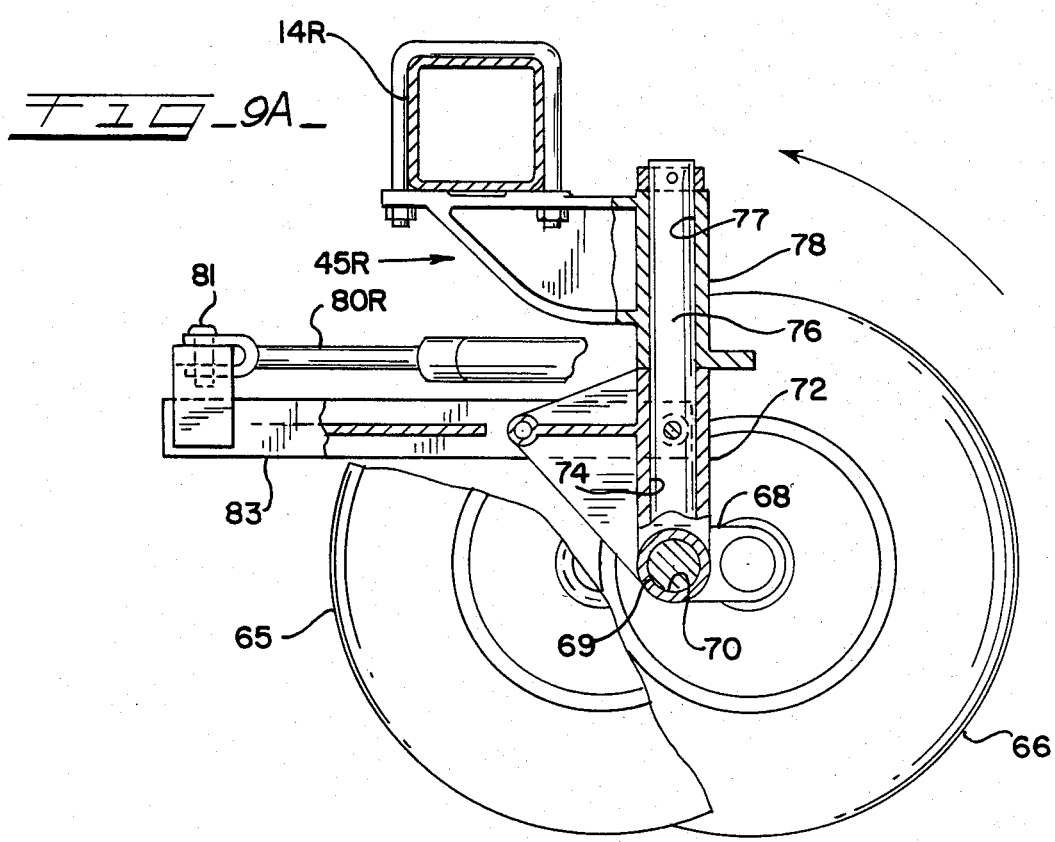
FIG_9A_

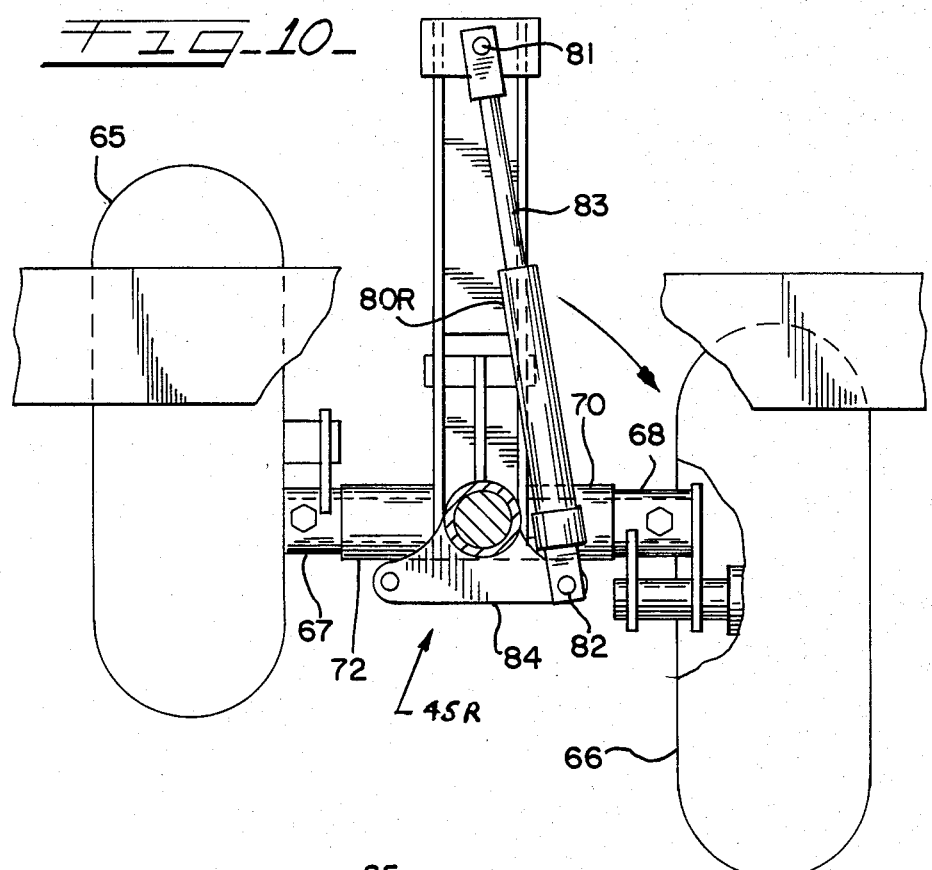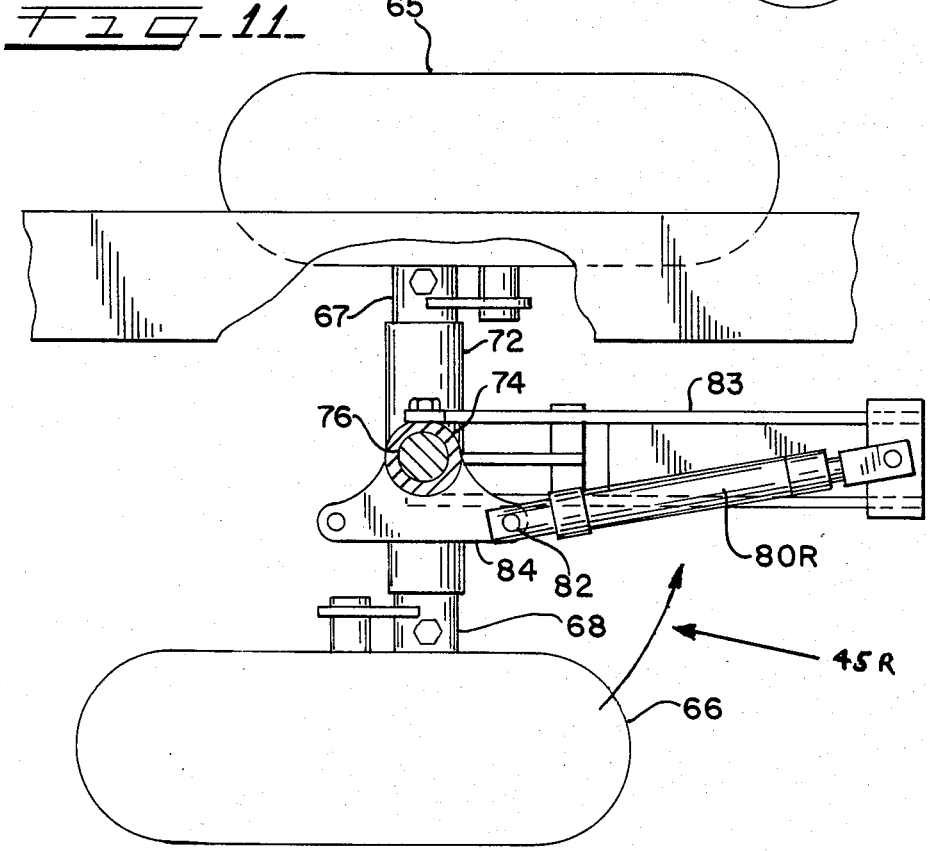

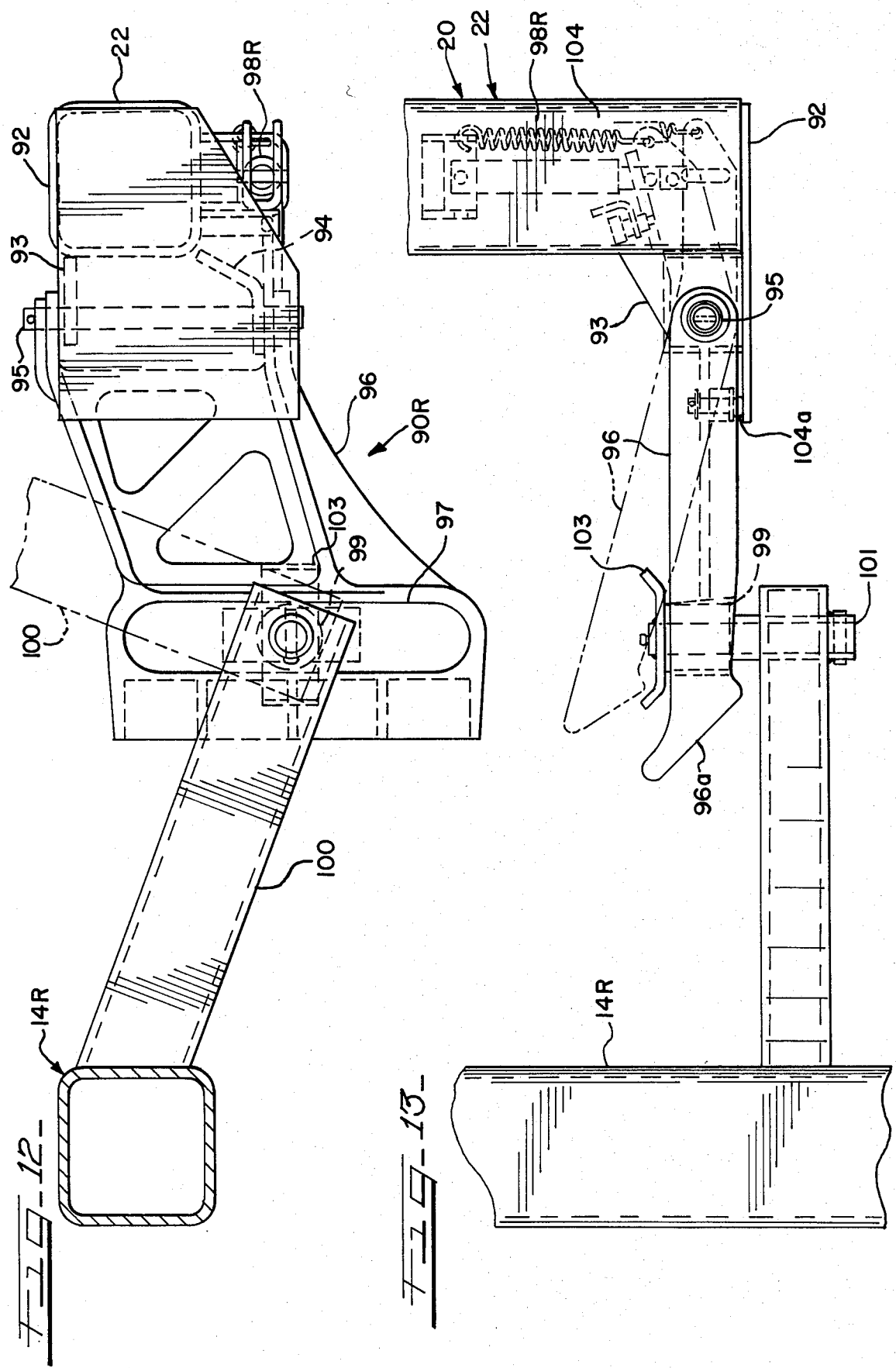

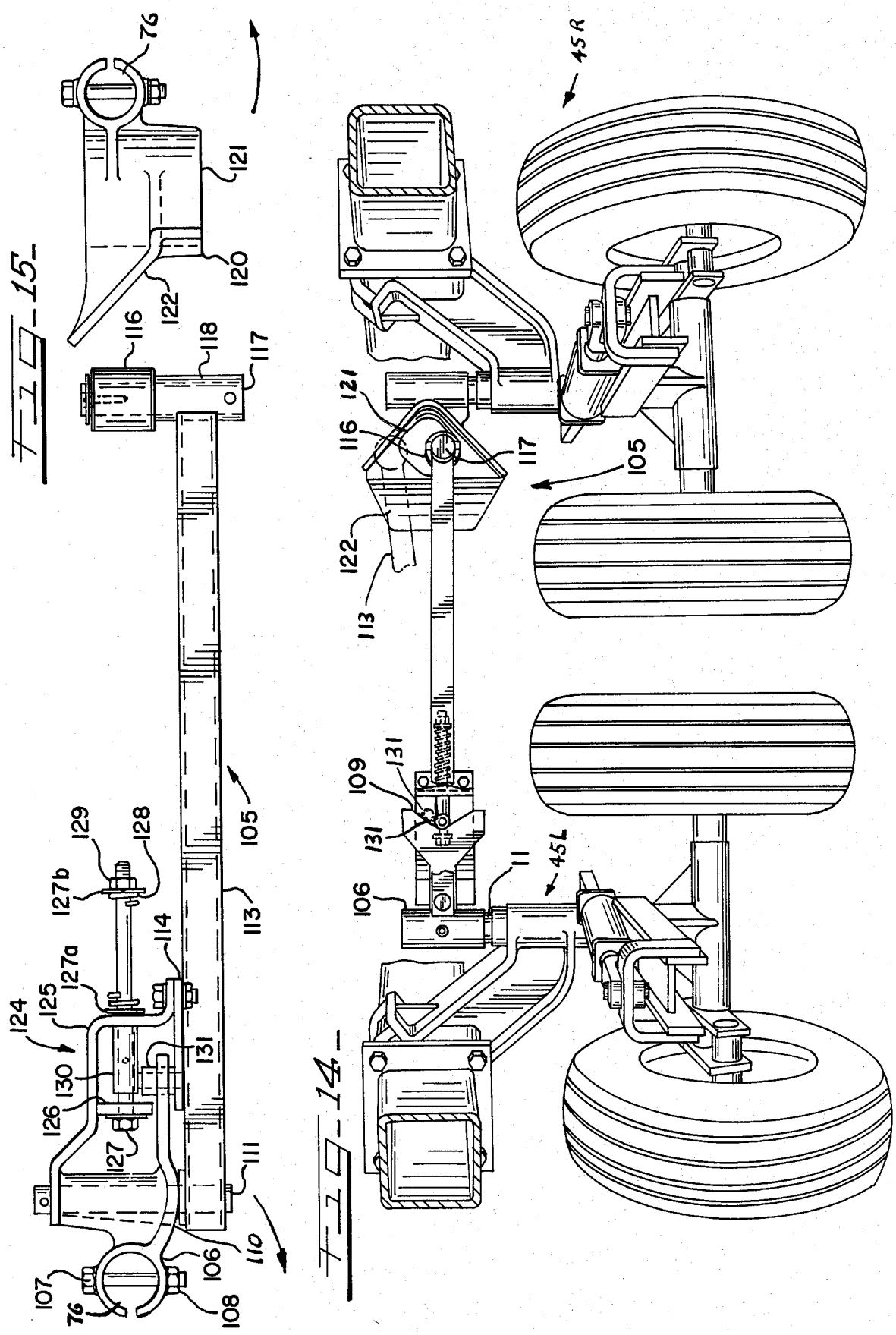

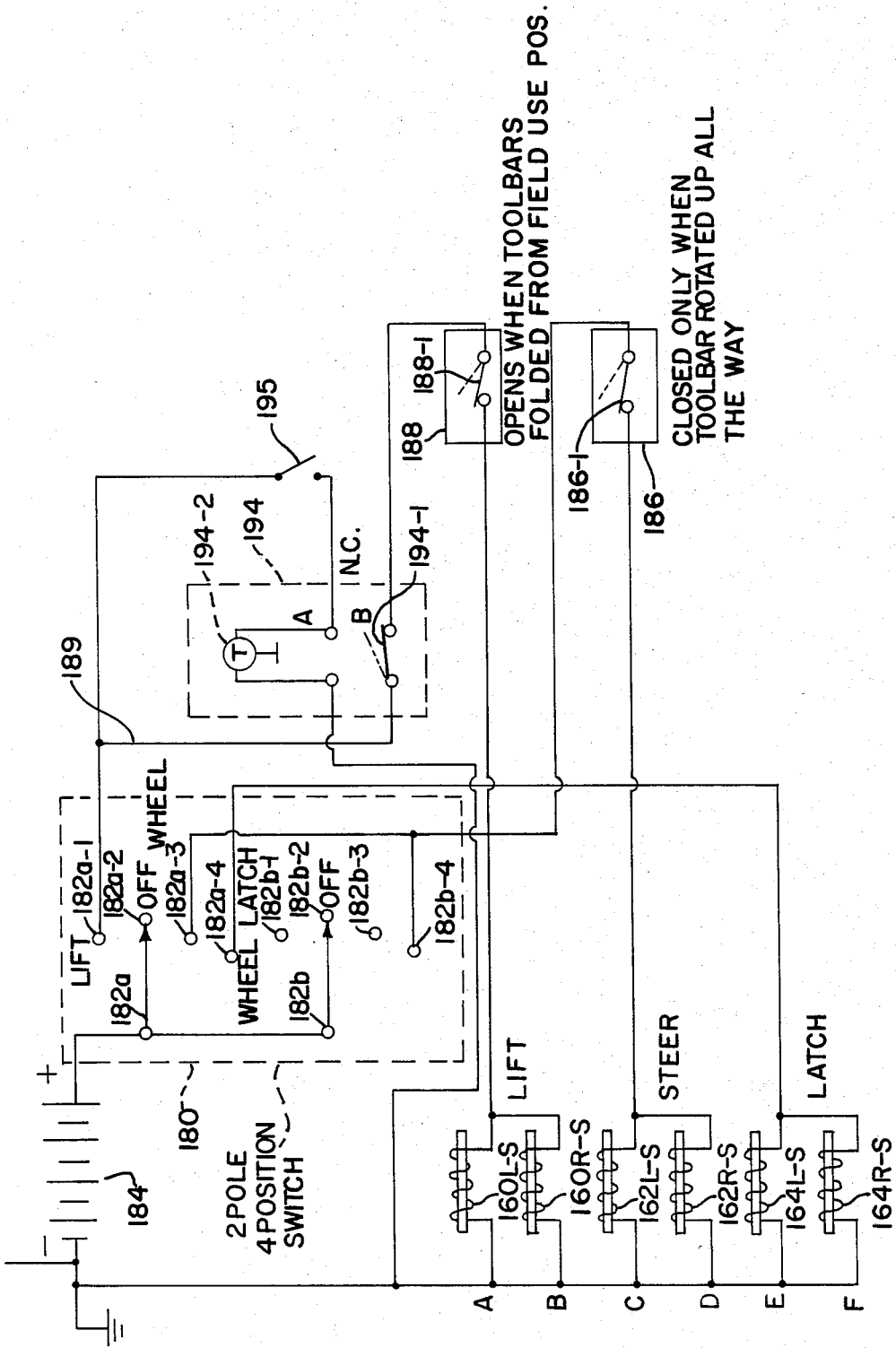

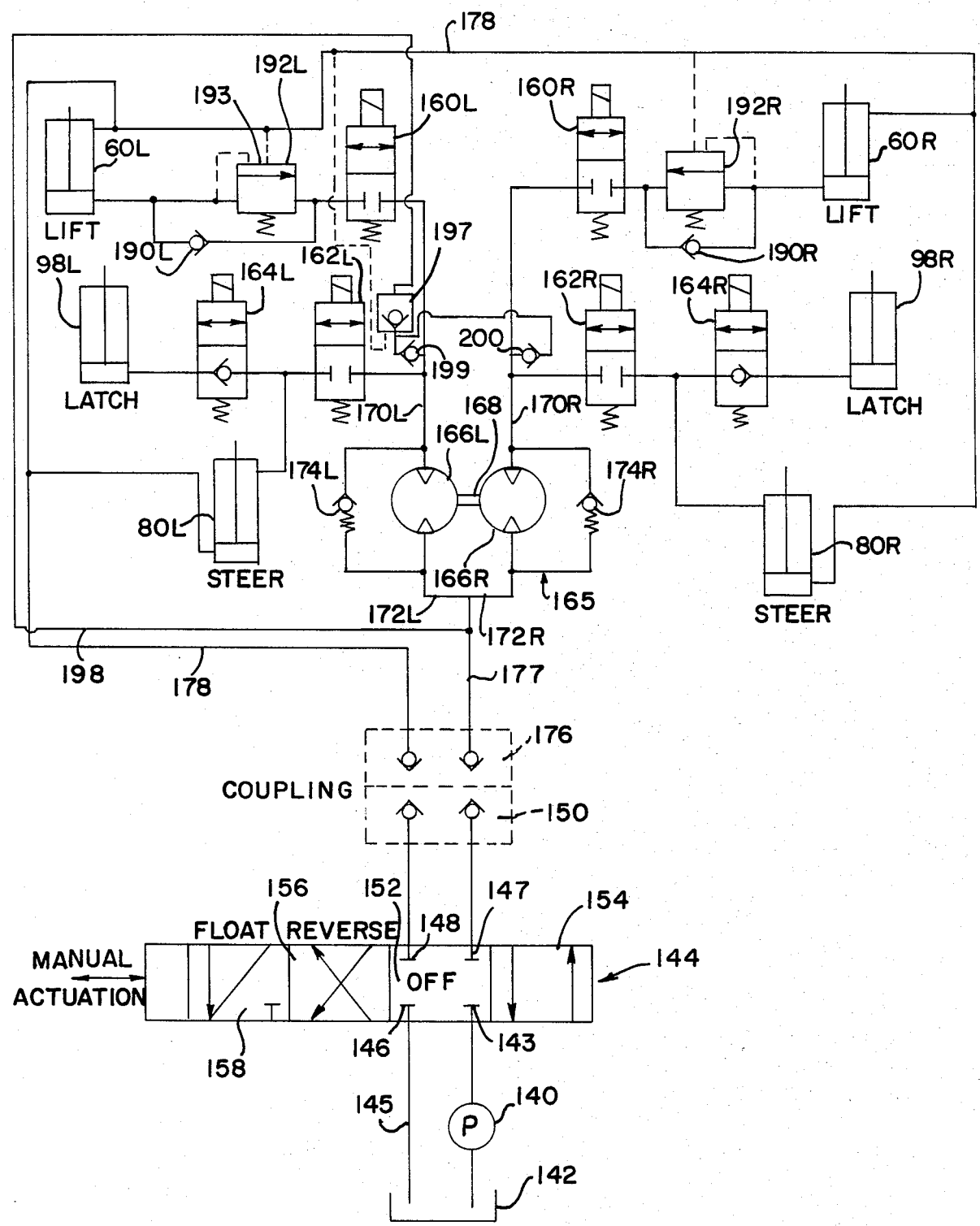

REARWARDLY FOLDING AGRICULTURAL IMPLEMENT

BACKGROUND OF THE INVENTION

In an effort to increase productivity, some farm implements have been increased in size substantially in recent years. For example, some planters, cultivators, fertilizers and other farm implements have a working path width in excess of forty feet. To increase the maneuverability of this size implement for off field or road transit conditions. it is common to have some form of articulation of the toolbar support.

In this regard, a collapsible farm implement would commonly have a central support, such as a wheeled trailer arrangement, and two toolbars would be hinged to this central support to swing about vertical axes. The outboard end of the toolbar, remote from the hinged inboard connection could have a wheeled support or could be cantilevered with appropriate re-enforcing struts or the like from the central support. In either case, the operational field use position of the toolbars would have them generally parallel to one another and extended in a direction crosswise to the direction of the farm implement travel. The width from end tip to end tip of the respective toolbars could thus exceed forty feet.

The road transit position is provided by rotating each toolbar approximately 90° toward one another, generally toward the rear of the implement, so that they then become parallel to one another but are extended in line with or parallel to the direction of the traffic. The collapsible condition of the implement would have a much narrower width, comparable to the width of the tractor, while the length obviously would be increased. Nonetheless the collapsed implement would have greatly increased maneuverability for travel down narrower roads, through narrow gates, around tighter turns, etc.

The problem yet remains however in maneuvering the implement, and the toolbars of the implement, between the opened or field use position and the collapsed or road transit position. It is sometimes exceedingly difficult to achieve this movement, in part because the site or field may not be level or may have a rough or uneven surface, and in part because of the sheer size or bulk of each toolbar. Frequently, the efforts of several people are needed to accomplish these collapsing or opening movements.

Of particular concern, the toolbars must be maintained in general synchronization relative to one another as they are opened or closed, or the outboard or trailing ends of the toolbars in effect can maneuver almost unwieldingly. In fact, it is possible for either of the trailing toolbars to swing in past its normal trailing position and become entangled with the other toolbar, and/or to become unstably located relative to the farm tractor. In summary, extreme difficulty can be experienced and great effort and care might be needed to correct the situation.

Moreover, certain tool elements that is in a planter for example, are quite lengthy in the direction parallel to the ground and crosswise to the toolbar. Thus, even when the toolbars are closed, the total width of the two sets of tool elements can easily exceed ten feet to again limit the maneuverability of the collapsed vehicle. It is sometimes possible to reduce this width by nesting the tool elements from the separate toolbars within one another. However, nesting cannot be used with some tool elements, like planters, so the overall width of the collapsed or closed implement is yet quite wide.

SUMMARY OF THE INVENTION

This invention relates to an improved collapsible farm implement including a wheeled frame or cart and having a pair of toolbars supported thereon at inboard vertical axis pivot means, whereby the toolbars are adapted to swing about the pivot means rearward between opened fully elevated field use positions and collapsed road transit positions.

An object of this invention is to provide wheeled truck assemblies for rollingly supporting the outboard ends of the toolbars, whereby each wheeled truck assembly can be rotated about a vertical steering axis in fully elevated field use position operable to roll crosswise to the toolbar and a road transit position operable to roll in line with the toolbar, whereby the wheeled truck assemblies effectively can be shifted to steer the toolbars between the fully elevated field use and road transit positions respectively upon moving the implement rearwardly or forwardly.

A specific object of this invention is to provide powered actuating means for steering the wheeled truck assemblies equally, whereby the steered toolbars are opened or collapsed in substantial synchronization.

A more detailed object of this invention is to provide a power cylinder means for shifting each wheeled truck assembly, a hydraulic fluid power source to actuate the cylinder means, and a flow divider operable thereby to admit equal volumes of such hydraulic fluid to the separate cylinder means to promote synchronized steering of the wheeled assemblies.

Another object of this invention is to provide means to mount each toolbar to rotate about a horizontal axis extending substantially parallel to the axis of the toolbar itself, whereby any tool elements carried on the toolbar are vertically shifted between a lowered operative field use position and a partially elevated inoperative field use position such as needed for implement turning at the end of an operative field use run.

A more detailed object is to provide a power cylinder means for rotating each toolbar about its horizontal axis, a hydraulic fluid power source to activate the cylinder means, and a flow divider operable thereby to admit equal volumes of such hydraulic fluid to the separate cylinder means to promote synchronized raising and lowering of all tool elements.

Another object of this invention is to provide that each toolbar can be rotated about said horizontal axis approximately a full quarter turn so that the tool elements carried thereby can be elevated to substantial vertical alignment in the full elevated field use position, further whereby the toolbars can then be rotated rearward about the inboard end vertical axis pivot means to the collapsed road transit postions, and whereby further this collapsed orientation of the toolbars with the tool elements in substantial vertical alignment can in design provide a narrower and more compact collapsed road transit arrangement for the farm implement.

Another object of this invention is to provide a hobble linkage means for holding the collapsed toolbars relative to one another in the road transit position, the hobble linkage means being arranged to lock automatically as the toolbars are shifting to and upon reaching the road transit position and being arranged also to release automatically upon the wheeled truck assemblies being shifted from the road transit positions to the fully elevated field use position.

Another object of this invention is to provide a caster wheel assembly operable as a wheeled support for the inboard ends of the toolbars, the caster wheel assembly being mounted for swinging movement about the inboard vertical axis pivot means, and linkage means maintaining the caster wheel assembly centered relative to and between the toolbars as they are moved between the fully elevated field use and road transit positions.

A more specific object of this invention is to provide a control, including both electrical and hydraulic, for allowing the implement to be shifted between the lowered field use and collapsed road transit positions by a sole operator, and without the operator leaving the tractor for increased safety and convenience.

Another object of this invention is to provide separate power cylinder means for operating respective right and left hand components, where a source of pressurized hydraulic fluid is provided for the actuation of the power cylinder means, and where a flow divider having two through paths is provided and operable to admit equal quantities of such hydraulic fluid to the power cylinder means and thereby provide that the right and left hand components are operated in synchronization with one another with rephasing relief valves incorporated in the flow divider for rephasing of lift cylinders at the end of the extension stroke and rephasing of steering cylinders on the retraction end of the stroke to insure synchronization.

BRIEF DESCRIPTION OF THE DRAWINGS

FIG. 1 is a perspective view of a tractor drawing the farm implement of the invention as seen generally from the right side thereof, where the implement has therein a preferred embodiment of the subject invention;

FIG. 2 is a plan view, shown somewhat in schematic for purposes of clarification of the tractor and farm implement illustrated in FIG. 1 and showing the implement opened for lowered normal field use and with the tool elements in the lowered position;

FIG. 3 is a plan view similar to FIG. 2, except showing the tool elements in the up or fully elevated field position and the outboard truck wheels on the toolbar rotated in a position operable to allow the farm implement to be collapsed to the road transit position;

FIG. 4 is a plan view similar to FIG. 2, except showing the farm implement collapsed to the road transit position;

FIG. 5 is a perspective view of part of the farm implement as seen generally from line 5—5 in FIG. 4, and showing specifically the common pivot mounts for supporting the two toolbars to allow rearward swinging movement thereof between the fully elevated field use position illustrated in FIG. 3 and the road transit position illustrated in FIG. 4;

FIG. 6 is a perspective view of part of the farm implement as seen generally from line 6—6 in FIG. 3, showing again the common pivot mounts for the two toolbars;

FIG. 7 is an elevational sectional view, as seen generally from line 7—7 in FIG. 2, illustrating specifically the inboard support of the toolbar to accommodate toolbar movement about a horizontal axis to shift the tool elements from the down position shown;

FIG. 8 is an elevational sectional view generally similar to FIG. 7, except showing the toolbar rotated so that the tool elements are in the up fully elevated field position;

FIG. 9 is an elevational sectional view, as seen generally from line 9—9 in FIG. 2, illustrating the general disposition of the outboard truck support wheels of the toolbar when the tool elements are in the down position as in the field use position;

FIG. 9A is an elevational sectional view similar to FIG. 9, except showing the general disposition of the outboard truck support wheels of the toolbar when the tool elements are in the up position, and the toolbar in the fully elevated field position, but yet differing from the illustration of FIG. 3 in that the outboard truck support wheels are yet in the lowered field use position of FIG. 2;

FIG. 10 is an enlarged plan view of FIG. 9A showing the right toolbar and its outboard truck support wheels therefor;

FIG. 11 is a plan view similar to FIG. 10, except showing the outboard truck support wheels rotated to the road transit position of FIG. 3;

FIG. 12 is an elevational view of the right latch portions removed, (similar to FIG. 5) for locking the right toolbar to the cart in the field use position;

FIG. 13 is a plan view of the latch of FIG. 12;

FIG. 14 is a rear view of the hobble device that maintains the left and right toolbars in the road transit position;

FIG. 15 is a plan view of the hobble device but shown disengaged;

FIG. 16 is a schematic diagram of the electrical control for the implement; and

FIG. 17 is a schematic diagram of the hydraulic system for the implement.

DETAILED DESCRIPTION OF THE INVENTION

FIGS. 1-4 illustrate a tractor 10 connected to a collapsible farm implement 12. The farm implement 12 has two toolbars 14L, 14R that in an operative lowered field use position (shown in FIGS. 1 and 2) are extended parallel to one another and crosswise to the direction of movement of the tractor 10 and implement 12 as indicated by arrow 15. The working path 17 produced by the extended toolbars 14L and 14R is illustrated in FIG. 2. Each of the toolbars 14L and 14R is mounted to swing about a vertical axis (after reaching the position of FIG. 3) so that it can become aligned with the direction of tractor and implement movement (as shown in FIG. 4). In this transit or road travel position, the tractor 10 and farm implement 12 are reduced to an effective approximate width of 18, much less than working path 17; and the vehicle can easily be maneuvered through gates, down narrow roads, and around tighter corners.

This invention teaches an improved construction for mounting the toolbars 14L and 14R to move between their opened lowered field use position (FIGS. 1 and 2) and their closed road transit position (FIG. 4). This invention also teaches an improved control for moving the toolbars under power between the opened and closed position.

As an aside, it can be noted that the implement 12 has many specific right and left hand components referenced from above and facing forwardly, which are otherwise virtually identical. These components will be identified in the specification by a number, and possibly also with a letter suffix, L for left and R for right, such as already used for the toolbars 14L and 14R, where the distinction would be useful for clarity of disclosure.

The implement 12 structurally has a frame or cartlike assembly 20 (see FIGS. 2-6) formed with a main cross beam 22 and a pair of support wheels 24 mounted on the cross beams 22 adjacent its opposite ends. A tongue 26 is pivoted at pins 28 (see FIG. 5) to the cross beam 22 and is connected to the tractor 10 at hitch 30. Bracket 32 is secured to the cross beam 22 aligned generally over the tongue 26, and a turnbuckle bar 34 is slidably connected at trunnion sleeve 35 to the bracket and is pivotally connected at pin 36 (see FIG. 6) to the tongue 26. A coil compression spring 37 is fitted over the bar 34, restrained against the sleeve 35 and shoulder 38 on the bar. The position of shoulder 38 from the pivot 36, and thus the bias of the spring 37, can be adjusted by rotating the sleeve 39 relative to the threaded section 40 of the bar. The turnbuckle bar 34 stabilizes the tongue 26 relative to the cross beam 22, while yet allowing the tongue 26 to rotate somewhat about the pivot pins 28 occasioned when the tractor 10 is pulling the implement 12 over uneven terrain.

A central support 42 (as shown in FIGS. 5 and 6) is rigidly connected to the cross beam 22 and is axially aligned with the tongue 26. The toolbars 14L and 14R are supported at their respective inboard ends at the rearward end of the central support 42 by means of pivot structure 44. Each toolbar 14L and 14R is supported at their respective outboard ends by means of a wheeled truck assembly 45L and 45R. With this mounting configuration, the toolbars 14 are maintained generally parallel to and elevated above the ground or supporting surface (except for unusual local discontinuity in the terrain).

The pivot structure 44 (see FIGS. 5 and 6) includes a yoke 46L and 46R which have a pair of spaced ears that fit between the spaced supports 48a, 48b, 48c, 48d of the central beam 42, and pin means 49 fits through aligned openings in these ears and beam supports.

The toolbars 14 not only can pivot about a vertical axis at pin means 49 but can also pivot up or down about an inner swivel connection 50 (as shown in FIG. 6) to allow for irregularity of the road or field. This is provided for by means of sleeve joint 51 being formed in the yoke housing 46R and toolbar support arm 52 being received at its inner end in the sleeve joint. The sleeve joint 51 is disposed at right angles relative to the pivot structure 44 and thus the swivel connection 50 is located on a generally horizontal axis.

Toolbars 14L and 14R further are supported so as to rotate about generally horizontal axis pivot connections 54L and 54R (see FIGS. 3, 5, 6, 7 and 8) that are substantially parallel to but offset from the toolbar itself. The pivot connection 54R is formed at the outboard end of the toolbar support arm 52, and the support arm is bent substantially 90° between its inboard end at the swivel connection 50 and its outboard end at the pivot connection 54R. The toolbar 14R has a transverse support stub 55 fixedly secured to the toolbar near its inbound end, and the transverse support stub 55 has a sleeve joint 56 that is received over the toolbar support arm 52.

As is illustrated in FIG. 1, the toolbars 14 have secured thereto a plurality of tool elements 57 in the form of planter units that are spaced apart laterally on the toolbar to allow for planting in rows extended in the direction 15 of vehicle movement. The details of construction of these planter units are of no concern to this invention. However, each planter unit can be seen to have spaced support wheels, furrow cutting disks located medially thereof, and a seed tube located between the cutting disks that is adapted to discharge seed from the hoppers at spaced intervals into the ground. Furrow closing and press wheels are also utilized by the units. The planter unit is secured to the toolbar by parallogram type linkage 59 relative to the ground to obtain proper ground contact. However, the planter unit does generally tend to stay in an elongated horizontal direction crosswise to the extent of the toolbar.

The pivot connections 54 allows the entire toolbar 14 to be shifted between a position whereat its tool elements 57 are in close working proximity relative to the earth (lowered field position) (see FIGS. 1, 2, and 7) and an elevated field position approximately 90° relative thereto whereat the tool elements extend almost vertically (see FIGS. 3, 6 and 8).

A power cylinder 60R (see FIGS. 6, 7 and 8) is supported between the toolbar support arm 52 and the toolbar 14R itself, as by pivotal connections 61 and 62 respectively. In this regard, a lug extension 63 is keyed or otherwise fixed to the support arm 52 to provide for the lateral or offset mounting of the pivot support connection 61 from the rotation mounting 54, as likewise is bracket 64 secured to the toolbar 14R to provide for the lateral or offset mounting of the pivot support connection 62 and the toolbar. With this arrangement, the powered extension and retraction of the power cylinder 60R causes the toolbar 14R to be rotated approximately the 90°, as previously mentioned, between the tool element down position, and the raised or tool element up position (see FIGS. 7 and 8). Toolbar 14L is similarly constructed utilizing cylinder 60L.

It is noted in this regard further, that during the rotation of toolbar 14R about the horizontal axis pivot 54, the toolbar is caused to rotate an equal amount about the wheeled truck 45R that supports the outboard end of the toolbar 14R. As illustrated wheeled truck 45R (see also FIGS. 9, 9a, 10 and 11) includes a pair of wheels 65 and 66 each supported to rotate on a horizontal axle, where these axles in turn are laterally offset from one another and are supported relative to housings 67 and 68 (see FIGS. 10 and 11). The housings 67 and 68 are coupled together by an axis pin 69 and the pin 69 in turn is free to rotate within a bearing sleeve 70 of housing 72. The laterally spaced close coupled bogie wheels allow for a leading wheel and a trailing wheel that can rock up and down relative to the housing 72 and thereby climb up and over uneven or rough terrain while averaging the toolbar height above the ground.

The housing 72 further has a second bearing sleeve 74 set at right angles to bearing sleeve 70, and the bearing socket 74 is received over a pin 76 mounted within a bearing sleeve 77 of bracket 78. The bracket 78 is secured to the toolbar 14 with the axis of the pin 76 normal to the toolbar and laterally offset therefrom. The entire wheeled truck assembly 45R thereby can rotate about the rotational axis of pin 76 that is disposed normal to and rearwardly offset from the toolbar 14. Wheeled truck 45L is similarly constructed.

A power cylinder 80R (see FIGS. 10 and 11) is supported at pin connections 81 and 82 between the housing 72 and toolbar 14, via arm 83 fixed to the wheel support housing 72 and a lug structure 84 fixed to the bracket 78. Thus, upon powered extension or retraction of the power cylinder 80, the wheeled truck assembly 45R is rotated relative to the toolbar 14R about pin axis 76 disposed normal to and offset rearwardly from the toolbar 14R. With this arrangement, wheeled truck 45R can be disposed in one fixed position (as illustrated in FIGS. 2 and 10) with the wheels set perpendicular to the toolbar which corresponds to movement of the vehicle during elevated and lowered field use when the toolbar is in the extended or opened position and the toolbar is crosswise to the path of implement movement, or in another fixed position (as illustrated in FIGS. 3, 4 and 11) with the wheels set parallel to the toolbar which corresponds to movement of the implement during road transit when the toolbar is in the collapsed or closed position. Cylinder 80L in combination with 45L also produces the action FIGS. 2 and 3.

Further, by moving the implement either forward or rearward with the wheel truck assemblies 45 R and L properly positioned, the toolbars can be steered into the collapsed or the open position as the situation demands. In other words, in the field use position (see FIG. 2) the wheels of the truck assemblies 45R and L are disposed perpendicular to the toolbars 14, whereas to collapse the vehicle, each truck assembly is merely shifted to about 45° to the toolbars (see FIG. 3), and the implement is then moved forward. The truck assemblies thereby merely steer the outboard ends of the toolbars inwardly toward the collapsed or closed position of the implement (see FIG. 4) at which point the truck assemblies are shifted to be parallel to the toolbars.

Conversely, from the collapsed position of the implement (as illustrated in FIGS. 4 and 11) where the wheel assemblies 45L, 45R are set parallel to the toolbars 14L, 14R, the wheel assemblies need only to be shifted to be 45° to the toolbars, (see FIG. 10) and the operator needs only then to back up the tractor and the farm implement whereupon the wheel assemblies 45L, 45R automatically steer the toolbars to the opened position (as illustrated in FIG. 2) at which point the wheel assemblies are shifted perpendicular to the toolbars.

It will be appreciated that the toolbars can only be rotated between the lowered to elevated field position when each wheeled truck assembly is oriented with the wheels perpendicular to the toolbars 14. At this orientation the pivot connection 54 for the inboard end of the toolbars are on an axis coincidental with the bearing sleeve 70 of the wheeled truck assemblies. As such, the toolbars remain substantially parallel to the supporting ground surface during its rotation, which rotation moves the tool elements between the position extended parallel to the ground and the position extended almost perpendicular to the ground. Further, the steering orientation of each wheeled truck 45 is only possible when the toolbars are in the elevated position and the pivot pins 76 are vertical. As noted, the proper orientation of the wheeled trucks are effective to steer the toolbars between the collapsed road transit and elevated field use. Appropriate interlocks will be outlined in greater detail later during the disclosure of the control of these components.

Latch assemblies 90R and L cooperate between the cross beam 22 of cart 20 and the toolbars 14 R and L to hold the toolbar in the fully elevated and lowered field use position. The latch assembly 90R (as more clearly illustrated in FIGS. 2, 5, 12 and 13) includes plate 92 that encloses the end of cart beam 22 and extends rearwardly thereof. Also, attached to beam 22 by welding or the like are upper and lower supports 93 and 94. Shaft 95 extending generally vertically through the supports via suitable openings provides a pivotal mounting for latch bracket 96 which also has cam surface 96a. Suitable cotter pins maintain shaft 95 in position. Bracket 96 also has a substantial rearward component which includes a generally vertical slot 97 for roller 99 pivotally mounted on arm 100 via shaft 101 rigidly attached thereto.

Arm 100 is rigidly attached to toolbar 14R. Preventing the accidental movement of roller 99 out of slot 97 of bracket 96 in the latched, lowered field use position shown in solid lines, is safety tab 103. Tab 103 is rigid with shaft 101 and is transverse and extends beyond the slot in the field working position shown. However, when toolbar 14R is rotated forwardly to the fully elevated position, arm 100 assumes the broken line position wherein tab 103 is aligned with slot 97 and the latch bracket 96 can be released.

Providing for the movement of bracket 96 is cylinder 98R. Cylinder 98R is mounted at its base end via a trunnion type mounting on the underside of beam 22. The rod end of cylinder 90R is connected by a pin connection to a clevis end of bracket 96. Cylinder 98L is a single acting cylinder. Spring 104 extending between a hole in the clevis end of bracket 96 and the trunnion mounting biases the latch bracket to the latched position shown in solid lines. Adjustable stop member 106 mounted on latch bracket 96 is conjunction with plate 92 provides a stop for the bracket in the latched position. The extension of the rod of cylinder 98 rotates latch bracket 96 to the unlatched position shown in broken lines wherein roller 99 and safety tab 103 are released, allowing the rearward fold of toolbar 14R. The connection of the rod of cylinder 98R is via a slotted hole in the clevis of bracket 96 to allow for the full retraction of the rod via its pin connection thereto. Also it allows the latching of bracket 96 when same is in the latched position and roller 99 contacts surface 96a and moves the latch until 99 moves into the position of FIG. 13. Latch assembly 90L is similarly constructed and is unlatched by cylinder 98L. Also to be noted is that the axis of roller 99 is the same as for pivot connection 54 and sleeve 70. Vertical slot 97 also provides for float of the toolbars 14R and 14L relative to each other in the lowered field use position.

In order to hold the toolbars 14R and 14L locked to, but spaced from, one another in the collapsed road transit position, a hobble device 105 is used between the toolbars. Referring to FIGS. 14 and 15, hobble device 105 includes hobble bracket 106 keyed to pin 76 of truck 45L and also secured thereto by bolt 107 and nut 108. Thus, bracket 106 rotates with pin 76 as truck 45L moves (as shown) between the road transit and elevated field use position. Bracket 106 also includes a V-shaped cam surface 109 and has a generally tapered opening 110 for pin 111 rigidly fixed to arm 113. A curved surface of bracket 106 adjacent arm 113 provides support for arm 106 as it and the attached pin move in tapered opening 110. Arm 113 also has plate 114 welded therto to provide support for the cam follower assembly to move on cam surface 109. Attached to the other end of arm 113 is roller 116 rotatably mounted on pin 117 rigidly held in tube 118 fixed to the end of arm 113. Similarly connected to pin 76 of truck 45R as bracket 106 is latch ramp 120 for movement with pin 76. Also, a part of latch ramp 120 is open ended pocket 121 for capturing roller 116 of arm 113. A cam surface 122 allows the gradual movement of the roller 116 thereover into pocket 121.

Cam follower assembly 124 is provided to maintain arm 113 and thus roller 116 in a horizontal position for movement into pocket 121 when desired. Assembly 124 also maintains the roller 116 in the pocket during road transit. Assembly 124 includes bracket 125 fastened to plate 114 of arm 113 by suitable fasteners. Bracket 125 also has an opening for pin 111 and is held thereon by a suitable fastener. Also, a part of bracket 125 is wall 126 which has an opening for bolt 127 extending therethrough. Bolt 127 also extends through another opening in bracket 125 and has a pair of spaced washers 127a and b thereon which contain a coil spring 128 therebetween. Nut 129 maintains bolt 127 on the bracket. Also, mounted on bolt 127 between wall 126 and a washer is sleeve 130. Sleeve 130 has a pin rigid therewith and rotatably mounted thereon is roller 131. Roller 131 contact cam surface 109. A slot in plate 114 for the pin rigid with sleeve 130 provides support during movement of roller 131 which moves with arm 113 as same moves vertically. As the roller 131 moves out of the junction of the fixed cam surface 109, see broken line position the sleeve 130 is moved against washer 127a and therefore against spring 128. Spring 128, when compressed, places a force on the roller forcing same against cam surface 109 and returns arm 113 to the horizontal position with roller 131 at the apex of the V-shaped surface. Hence, assembly 124 positions arm 113 and thus roller 116 for movement into pocket 121. Also, to be noted is that when roller 116 encounters cam surface 122 of latch ramp 120, arm 113 and pin 111 can move in tapered opening 110 until roller 116 moves into the pocket 121. Here too, as the roller 116 moves tightly against V-shaped cam surface 109, sleeve 130 compresses spring 128 which in turn forces arm 113 and thus roller 116 back into the pocket 121.

Particularly evident, when considering FIG. 14 is that when both trucks 45R and 45L open simultaneously to the elevated field use condition, is that arm 113 and thus roller 116 moves along with latch ramp 120 to unlock the hobble. If latch ramp 120 moved first before arm 113, the hobble would not unlock as the tapered opening does not provide enough travel by itself. If the arm 113 and roller moved before the latch ramp, the hobble would unlock. To avoid a sequence, the rotary flow divider provides simultaneous operation for unlocking the hobble by so rotating the trucks 45R and 45L. This can be done automatically from the driver's seat.

It has been found desirable to incorporate a trailing wheel assembly 132 (see FIGS. 1-5) to support part of the load of the implement toolbars. This wheel assembly 132 is carried on a support beam 133 that is pivoted from central beam 42 about the pivot joint 44 coincidental to the inward toolbar vertical pivot connections. The wheel assembly 132 has a trailing wheel 134 supported in the fashion of a caster wheel so that it can pivot about a leading vertical pivot axis at pin 135 while the wheel itself trails out and rotates on a horizontal axle 136.

In a preferred embodiment, the trailing wheel assembly 132 is centered relative to the toolbars 14L and 14R regardless of the orientation of the toolbars. This is accomplished by a pair of links 137L and 137R pivotally connected to the separate toolbar yoke housings 46L and 46R and to a forward extension beam 138 keyed to and aligned with the trailing wheel beam 133. Thus, rollers 139 are guided in axial slots 139a in the beam extension 138 and the links 137L and 137R are pivoted to these rollers and are connected at pins 139b to the yoke housing 46.

In an alternate embodiment of this same toolbar constraining means, a power cylinder (not shown) can be employed between the pivot support 44 and the roller 139 to move the toolbars in unison relative to one another, while concurrently maintaining the trailing wheel assembly 132 in a centered position relative to the toolbars.

Alternatively, it would be possible by means of the above mentioned link connection and power cylinder to tie the movement of the toolbars 14L and 14R relative to one another without the use of a trailing wheel assembly.

The particular functional mechanism for the implement is of no consequence since it can be conventional and the planter is only illustrative of the collapsible implement. In other words, it could be a planter, cultivator, etc. As illustrated however, the planters in their functional position extend horizontally from the toolbar a considerable distance. Accordingly, the width of the collapsed toolbars in the road transit position would yet be quite large. One of the principal features of this invention is the initial toolbar rotation throughout approximately a 90° angle operable to elevate the tool elements to vertical orientation. This allows for a most compact implement in the collapsed road transit position, and provides great implement mobility.

CONTROL AND OPERATION

Another very important feature of this invention is the ability for one operator to control from the tractor cab the shifting of the toolbars 14L and 14R between the collapsed road transit position and the lowered opened field use position. In this regard, there would be in the cab area of the tractor a control panel (not shown) having separate control levers and switches that the operator can selectively actuate to bring about the necessary control. These components activate hydraulic controls for steering the toolbars, for releasing and setting the latches for holding the toolbars in place, and further for raising and lowering the tool elements.

In this regard, the hydraulic circuit (FIG. 17) illustrates the power lift cylinders 60L and 60R for rotating the toolbars 14L and 14R about a horizontal axis to raise and lower the tool elements; the steering cylinders 80L and 80R used to rotate the wheeled truck assemblies 45 and steer the toolbars between the elevated field use and road transit positions; and the latch cylinders 98L and 98R used for shifting the latches effective to hold the toolbars extended crosswise to implement travel in the elevated and lowered field use position.

Also illustrated in FIG. 17 is a pump 140 having its input drawing from a reservoir 142 and its output directed to port 143 in a conventional tractor valve 144, and a return line 145 between the valve port 146 and reservoir 142. Shown also are ports 147 and 148 in the valve and the line connection checks at separable coupling 150. Each of these components conventionally will be located on the tractor 10. The valve 144 has four operative positions, shown with section 152 positioned in the off position, and indicating also one "on" position section 154 whereat the through passages would cross connect the opposite ports 146-148 and 143-147; indicating also a second "on" position section 156 whereat the reverse cross connection is made between opposite ports 148-143 and 147-146; and illustrating also a float position section 158 whereat ports 147 and 148 connect with port 146 and port 143 is closed. The valve can be shifted manually or under power assist.

Control valves 160L and 160R, 162L and 162R, and 164L and 164R are also illustrated, being used to selectively connect the pressure source with the respective power cylinders 60, 80 and 98. Each of these valves has a two position orientation: where one position is open to connect the lines feeding into and from the valve, while the opposite position of the respective valves 160 and 162 isolates the lines from one another and the valve 164 has a one way check between the lines. The valves are normally spring biased to the closed or checked position shown, and are shifted by solenoids 160L-S, 160R-S, 162L-S, 162R-S, 164L-S and 164R-S, as will be noted with respect to the electric control of FIG. 16.

Shown also in FIG. 17 is rotary flow divider 165 consisting of two positive displacement elements 166L and 166R that are keyed mechanically to one another by linkage 168. Thus, the individual volumetric outputs from the flow divider elements 166L and 166R correspond and are equal so as to force the exact volume of hydraulic fluid into each left and right side outlet. A flow by-pass line connects the outlet line 170L and 170R to the inlet line 172L and 172R through re-phasing relief valves 174L and 174R to allow for re-phasing of the cylinders. A coupling 176 that can be separately joined to tractor coupling 150 is connected through one way checks with the divider inlet line 177 and the circuit flow line 178. It will be appreciated that the coupling checks open when the couplings 150 and 176 are engaged, and become seated only when the couplings are separated.

The electrical control (FIG. 16) has a main selector switch 180 (which would be on the control panel in the tractor cab) that is a two pole, four position switch. The switch 180 has common throw arms 182a, 182b connected with the positive of a source of power (indicated at 184 in the form of a D. C. battery). Also, illustrated are the solenoids 160L-S, 160-S, 162L-S, 162R-S, 164-S and 164R-S corresponding specifically to the flow control valves 160, 162 and 164 used for operating the power cylinders previously noted with respect to FIG. 17. The circuit further has limit switches to preclude operation of certain of the components unless the wheeled trucks 45 and/or toolbars 14 are in the proper orientation. Thus, the limit switch 186 is used to prevent the operation of the steering wheeled truck assemblies 45 from the field use position except when the tool elements are completely elevated or are vertical. Similarly the limit switch 188 precludes operation of the lift cylinders for the toolbars in any position other than when the toolbars are in the elevated or lowered field use position and further when the latch is fully engaged.

When selector switch 180 is positioned with the common throw arm 182a and 182b against contact 182a-1, the circuit includes line 189 through normally closed contacts 188-1 of limit switch 188 to energize the lift solenoids 160L-S and 160R-S. This shifts the control valves 160L and 160R to the open position to connect the flow divider 165 with the cylinder or piston side of the lift cylinders 60L and 60R. This is accomplished through check valves 190 for flow to the cylinders to extend the rods to lift the toolbars and through pressure active release valves 192 for flow from the cylinders 60 to retract the rods to lower the toolbars. The release valve 192 is normally spring biased to the closed position (as shown) but is biased by pressure in return line 178 to the opened position to allow venting of the cylinder side of the lift cylinder 60 to the reservoir 142 via flow divider 165. When the cylinder side of the lift cylinder 60 is pressurized the toolbar is rotated to elevate the tool elements (from the position of FIG. 7) to the extent required even to where they are oriented vertically (as in FIG. 8).

As earlier noted, the limit switch 188 precludes operation of the lift cylinder circuit in any position other than when the toolbars are fully extended in the lowered or elevated field use position, and possibly even further only when the latches are engaged and set in place. This would minimize potential damage to the unit were the selector control 180 accidentally put in this operative position when in fact it was not intended.

Once the switch 180 is shifted, the operation of the implement is further dependent upon the proper manipulation or positioning of the conventional hydraulic valve 144. Thus, to elevate the tool elements, section 154 of the valve must be lined up with the valve ports, whereupon the high pressure fluid from pump 140 is communicated via connected ports 143–147 to the flow divider 165 and the line 178 is connected by ports 148–146 to the reservoir 142. The fluid flow is metered through the flow divider elements 166L and 166R as noted in equal volumes so that the lift cylinders 60L and 60R are elevated in synchronization.

When the tool elements have been elevated to the vertical position and the lift cylinders 60 on the cylinder side are completely filled with the hydraulic fluid, deenergization of the control solenoids 160 will allow the control valves to be spring biased to the off position whereupon each cylinder 60 is thereafter isolated and held fixed in this position by check valves 190. The selector switch 180 can also be shifted off contact 182a-1 to affect this.

In order to retract the extended lift cylinders 60 and lower the tool elements from the vertical to the horizontal, the valve 144 is shifted to line up valve section 156 with the valve ports. Thus, the high pressure fluid from pump 140 is directed via connected ports 143–148 and line 178 to the rod side of the lift cylinders, and the cylinder side of each cylinder 60 is connected through the pressure release restrictor 192 back through the flow divider 165 and interconnected valve ports 147–146 to the reservoir 142.

Another relay 194 is also shown in the circuit line 189, having normally closed contacts 194-1. This relay 194 is energized under normal field use conditions when the operator raises the tool elements sufficiently off the ground to close normally open switch 195 (about 30° toolbar rotation) to turn the implement around at the end of a run. In such a case the relay 194 is energized and contacts 194-1 open, and a timer 194-2 is energized. Valves 160L and R close which stops the tool elements elevated at the noted angle. After some preset time lapse, 2 to 5 seconds for example, the timer times out and contacts 194-1 close; whereupon the operator could lower the tool elements by manipulating the hydraulic valve 144, or allow the lift control cycle to proceed to elevate the tool elements completely to the vertical road transit positions. Switch 195 stays closed as the toolbars move to the vertical position and opens upon lowering through the 30° position. Only when the switch closes on subsequent lifting is the delay again activated.

When the selector switch 180 is positioned with the throw arms 182 against contacts 182a-2, 182b-2, the control is in the off mode, particularly intended for implement use in the road transit position.

When the selector switch 180 is positioned with the throw arm 182a against contact 182a-3, the circuit is completed through the closed contacts 186-1 of limit switch 186 to the steering solenoids 162L-S and 162R-S. Note again that the limit switch contacts 186-1 are closed only when the toolbars are rotated completely to the elevated position. The shifted flow control valves 162L and R allow hydraulic fluid to be metered in equal volumes to and from the steering cylinders 80L and 80R for the wheeled truck assemblies 45L and 45R. When the cylinder ends of the cylinders 80 are filled with hydraulic fluid and the cylinder rods are extended, the wheel assemblies 45L and R are in the field use position (see FIG. 10). The collapsed implement 12 can now be steered to the opened field use position merely by backing the implement up until the toolbars become fully extended and parallel.

When the selector switch 180 is positioned with throw arms 182a and 182b against contacts 182a-4 and 182b-4 respectively each control valve solenoid 162 (L and R) is energized at contact 182b-4 by the circuit to have the control valves 162 open. This connects the wheeled truck assembly cylinders 80, as above noted, with the hydraulic valve 144, via flow divider 165. Contact 182a-4 completes a circuit to energize the latch solenoids 164L-S and 164R-S, whereupon control valves 164L and 164R are shifted to the open position. Again, actuation of the hydraulic valve 144 to the position where section 154 is lined up with the valve ports will connect high pressure fluid from pump 140 through the aligned connected ports 143-147, the flow divider 165, and opened flow control valves 162 and 164 to the latch cylinders 98. Pressurization of the cylinder end of the latch cylinder 98 extends the cylinder and holds the latch mechanism in the released position.

The hydraulic valve 144 has a fourth position whereat section 158 is lined up with the valve ports 143, 146, 147 and 148. In this position, the ports 148 and 147 are commonly connected to the return port 146 and high pressure port 143 is closed. The fluid in the cylinder side of the latch cylinders 98 is thus controllably bled or floated out under the bias of the exterior return springs 104 to allow for the latches 90 to be set. The control valves 164L and R have a release one way check valve in the off or deenergized position to allow continuing back flow of the hydraulic fluid to the reservoir 142. The latches 90 are thus held set by the springs 104.

Also shown in FIG. 17 is structure to prevent possible cavitation of the non-bottomed cylinder if either the lift cylinder or steering cylinder on one side of the circuit bottoms out before the comparable cylinder on the other side on flow to the flow divider. Normally, when the lift cylinders are retracted and one cylinder bottoms out before the other, the rotary flow divider will continue to rotate until flow from the cylinder not bottomed out stops. Similar performance is obtained when the steering cylinders are extended. Thus, the lift and steering cylinders are, in effect, rephased in both directions. However, when the implement has a condition such as a substantial weight imbalance from one side to the other which may cause greater out of phase conditions, for example on lowering, a pilot operated check valve 197 is placed in line 198 which is connected to line 177 to provide oil flow therefrom through check valves 199 and 200 to the bottomed cylinder. Pilot operated valve 197 is opened when high oil pressure is present in line 178. The steering cylinders are similarly treated to allow the rephasing without excessive cavitation.

Considering now the operation of the control in shifting the implement from the road transit or collapsed position (FIG. 4) to the field use position of FIG. 1 or FIG. 2. The selector switch 180 is shifted from the off position (2) to the wheel and latch position (4) to engage contacts 182a-4 and 182b-4 and energize latch solenoids 164L-S and 164R-S and steering solenoids 162L-S and 162R-S to open valves 164L and 164R and 162L and 162R. Valve 144 is then shifted to align section 156 with the valve ports. Pressurized fluid moving through line 178 extends the rods of cylinders 80L and 80R and also maintains the rods extended of latch cylinders 98L and 98R with the oil passing through the flow divider 165 to the sump 142. Due to the flow divider action, both wheeled trucks 45L and 45R open equally and release hobble device 105. At preferably 45° of rotation of trucks 45L and 45R the valve 144 is placed in the off position of section 152 and the implement backed up. (If the trucks 45L and 45R were initially rotated 90° to the position of FIG. 2, the wheels of the trucks would skid in the process of backing up). As the steering action becomes less effective, the valve 144 is again returned to position 156 and the wheeled trucks 45L and 45R are moved to the position of FIG. 2, where the wheels are normal to the toolbars and the implement backed into position where they are approaching the position of FIG. 3. At this point the valve 144 is placed in the float position of section 158 to allow the latch cylinders to bleed and springs 104 to close the latches 90L and 90R. Further backing up of the implement causes the roller 99 (see FIGS. 12 and 13) to contact surface 96a of bracket 96 to move same against the spring 104 and to move into slot 97 to be maintained therein in the latched position by spring 104.

With the implement in the fully elevated position of FIG. 3 except that the wheeled trucks 45L and R are in the position of FIG. 2, the implement can now be lowered to the field use position of FIG. 1. This is achieved by placing the selector switch 180 in the lift position wherein contact 182a-1 is engaged and solenoids 160L-S and 160R-S energized thus opening valves 160L and 160R, and valve 144 moved to align section 156 with the ports. Fluid moving through line 178 will retract the rods of cylinders 60L and R with open restrictor 192 for flow back through the divider 165 to the reservoir. The implement thereby being lowered to the field use position of FIG. 1. The implement then is operated by manipulation of valve 144 between the sections of 154 and 156.

To shift the implement from the lowered field use position to the road transit position, the tool elements are first elevated by having the selector switch 180 in the lift position with contact 182a-1 engaged valves 160L and 160R open and valve 144 with section 154 aligned with the valve parts. Fluid moving through flow divider 165 valves 160L and 160R extends the rods of cylinders 60 and 60R generally in unison. Should one cylinder extend fully before the other, the rephasing relief valves 174L and R are utilized to bring the cylinders back into phase for synchronized operation. When the tool elements are elevated completely, the selector switch 180 is moved to the wheel and latch position 4 wherein contacts 182a-4 and 1182b-4 are engaged and solenoid 162L-S and 162R-S and 164L-S and 164R-S are energized to open valves 162L and R and 164 L and R for flow from valve 144 via section 154 through divider 165. The rods of cylinders 98L and R are extended and latches 90 are released. Also, the rods of cylinders 80L and the R are retracted to preferably 45° and thus trucks 45L and 45R and the valve 144 then adjusted to the off position with section 152 aligned with the ports to maintain them at this angle. The implement is then moved forward with toolbars 14L and 14R moving rearwardly. (If the trucks are moved to the full transit position a longer forward travel is required to complete the fold cycle.) As the steering becomes less effective, section 154 is again aligned with the ports and the wheeled trucks 45L and 45R are moved to the full road transit position shown in FIG. 3 and the implement moved forward until the hobble 105 is engaged and the implement is in the road transit position of FIG. 4. It is to be noted that rephasing of cylinders 80L and 80R via valves 174L and 174R occurs on cylinder rod retraction to maintain synchronized action. In the road transit position the selector switch 180 is in the off position with section 152 of valve 144 aligned with the ports and the latch cylinders 98L and 98 with their rods extended and the rods of cylinders 80L and 80R retracted.

What is claimed is:

1. A rearwardly folding agricultural implement comprising:
   a. a wheeled cart adapted to be connected to and drawn by a tractor;
   b. a pair of toolbars supporting ground working elements, with each toolbar being pivotally mounted on said cart generally adjacent the bar inner end for movement between a first lowered field operating position wherein said bars are transversely aligned to the direction of implement travel and said ground working implements are mounted rearwardly of said toolbars in ground engaging relation and an elevated transverse second position above said first position and then to a third road transit position in which the toolbars are pivoted rearwardly;
   c. ground engaging steerable wheel support means mounted on each toolbar generally adjacent the bar outer end and supporting the toolbar in all of said positions;
   d. latch means for connecting each toolbar to the cart in the field operating and elevated positions;
   e. first hydraulic means for moving each toolbar between said first operating position and said second elevated position;
   f. second hydraulic means for actuating each said latch means;
   g. third hydraulic means for steering each said wheel support means;
   h. control means for operating said first, second and third hydraulic means independently in sequence; and
   i. a hydraulic circuit for said first, second, and third hydraulic means including a flow divider for providing substantially equal flow to each said third hydraulic means for movement of said toolbars between the elevated second and rearward road transit positions upon movement of the implement.

2. The implement of claim 1 in which said flow divider also directs substantially equal flow to each said first hydraulic means for movement of said toolbars between the lowered field operating and elevated second positions.

3. The implement of claim 2 in which each said first and third hydraulic means are double acting cylinders and said flow divider is a rotary flow divider, and further comprising bypass means for said flow divider for rephasing each said first cylinders at the extension end of each stroke and each said third cylinders on the retraction end of each stroke.

4. The implement of claim 3 further comprising a check valve in the cylinder end line of each of the first cylinders to prevent flow therefrom after partial rod extension and a pressure sensitive valve to allow flow therefrom upon pressure in the rod end line.

5. The implement of claim 4 further comprising a pilot operated check valve responsive to fluid pressure to said first cylinders and said third cylinders to provide flow and check valves to receive same and direct to the flow divider from flow out of the flow divider to reduce cavitation as developed.

6. The implement of claim 3 in which said control means includes an electrical circuit and a solenoid valve for each first, second and third cylinders and a switch for actuating said solenoid valves.

7. The implement of claim 6 further comprising a time delay relay for said solenoid valves for the first cylinders to hold the implement in the partial raised position at the end of the field until turn around is completed.

8. The implement of claim 7 further comprising a limit switch for preventing operation of said solenoid valves for said first cylinders in other than the field operating position.

9. The implement of claim 8 further comprising a limit switch for preventing operation of said solenoid valves for said third cylinder except when the toolbars are in the elevated position.

10. The implement of claim 1 in which each toolbar is pivotally mounted on said cart about a horizontal and longitudinally extending axis in the field operating position which allows bar float independent of the other bar and, said axis extending horizontally and transversely of the direction of travel in the road transit position allowing vertical pivot of the toolbar about the cart.

11. The implement of claim 1 in which all of the pivotal mounting axes of said toolbars are centrally located on said cart.

12. The implement of claim 11 in which said wheel support means includes a pair of offset, close coupled bogie wheels having a standard connected to said toolbar and to a pivot between the wheel centers with the pivot being aligned transversely with the toolbar pivot for moving same between an operating and elevated positions.

13. The implement of claim 12 in which said third hydraulic means is connected to said standard and said wheels for steering said wheel means from a position normal to the toolbar for the field operating elevated position to a position parallel to the toolbar for the transit position.

14. The implement of claim 13 in which said latch means comprises a roller mounted on said toolbar and said roller is also transversely aligned with said bogie wheels pivot and the pivot for moving the toolbar between a field operating and elevated position, and a movable plate pivotally mounted on said cart for capturing said roller in the working and elevated positions.

15. The implement of claim 14 in which said second hydraulic means is a hydraulic cylinder connected to said plate for actuating same to the released roller position, said cylinder having a spring return to the latched roller position and further including means preventing release of the roller unless the toolbar is in the elevated position.

16. The implement of claim 1 further comprising hobble means for latching the toolbars together in the road transit position.

17. A rearwardly folding agricultural implement comprising:
   a. a wheeled cart adapted to be connected to and drawn by a tractor;
   b. a pair of toolbars adapted to support ground working elements, with each toolbar being pivotally mounted on said cart generally adjacent the bar inner end for movement between lowered field operating position wherein said bars are transversely aligned to the direction of implement travel and an elevated generally vertical position and then to a road transit position in which the toolbars are pivoted rearwardly;
   c. wheel support means mounted on each toolbar generally adjacent the bar outer end;
   d. latch means for connecting each toolbar and the cart in the field operating and generally vertical positions;
   e. first hydraulic means for moving each toolbar between an operating and a generally vertical position;
   f. second hydraulic means for actuating each said latch means;
   g. third hydraulic means for steering each said wheel support means;
   h. control means for operating said first, second and third hydraulic means in sequence;
   i. a hydraulic circuit for said first, second, and third hydraulic means including a flow divider for providing substantially equal flow to each said third hydraulic means for movement of said toolbars between the general vertical and rearward road transit positions upon movement of the implement; and
   hobble means for latching the toolbars together in the road transit position;
   said hobble means for said toolbars being mounted between each wheel support means whereby, movement of the wheel support means to the generally vertical and field operating position unlatches same and including spring means to latch the hobble means upon movement to the road transit position.

18. The implement of claim 17 further comprising a castering assist wheel mounted on a beam pivotally connected on a vertical axis for the rearward pivot of the toolbars to the transit position, said castering wheel being located rearwardly of said pivot and providing support for said vertical axis.

19. The implement of claim 18 in which said beam extends forward of said pivot and has a pair of slots, a roller in each said slot and a pair of links connected to said rollers and to said toolbars, said links maintaining said beam and therefore said wheel in a centered position to said cart during movement between the generally vertical and road transit positions.

20. The implement of claim 19 further comprising a hitch tongue pivotally connected to said cart and adapted to be connected to a tractor, a link connected to said tongue and resiliently connected to said cart to provide a resilient hold down force to said cart.

21. The implement of claim 20 in which said force is adjustable.

22. A rearwardly folding planter comprising:
   a wheel supported hitch cart having a forwardly extending hitch adapted for connection to a tractor and providing a vertical pivot structure aligned on the path of travel with the hitch;
   left and right pivot arm structures having one end pivotally connected to said vertical pivot structure and respectively extending to the left and right therefrom and having a distal end providing a horizontal axis pivot support, said pivot arm structure being swingable about said vertical pivot structure on said cart between an operating position wherein said horizontal axis is transverse of the direction of travel and a transport position wherein said horizontal axis is parallel to the direction of travel;
   left and right toolbars pivotally mounted respectively on said left and right pivot arm structures and extending parallel to said horizontal axes thereof to wheel supported distal ends;
   a plurality of planting units mounted only on said toolbars, being disposed rearwardly thereof in ground engaging relation in the operating position;
   means for pivoting said toolbars, in the transversely extended position, about said horizontal pivot arm axes between the operating position and an intermediate position wherein said planting units are disposed above said toolbars in perpendicular relation to the operating position of said planting units;
   and means allowing pivoting of said toolbars and said pivot arm structures rearwardly about said vertical pivot structure on said cart to transport positions parallel to the path of travel.

23. The invention in accordance with claim 22 said pivot arm structures further comprising a horizontal axis pivot joint between said one end and said distal end, said horizontal axis being parallel to the path of travel when said planter is in the operating position.

24. The invention in accordance with claim 23 and said toolbars each having a latch pin disposed on a horizontal axis parallel to the toolbars and said cart having a latch plate disposed in a fore-and-aft plane and having a slot engaged by said latch pin in the operating position to prevent rearward pivoting of said toolbars and pivot arm structures while permitting flexing of said toolbars in a transverse vertical plane about said horizontal pivot joints in said pivot arm structures.

25. The invention in accordance with claim 24 and said latch pins having a rolling surface engaging said slots.

26. The invention in accordance with claim 24 and said latch plates being selectively moveable to disengage said latch pins to permit rearward folding of said toolbars about said vertical pivot structure.

27. The invention in accordance with claim 22 and said wheel supported distal ends of said toolbars having steerable wheeled support trucks attached to said toolbars and engaging the ground in all positions of said planter.

28. The invention in accordance with claim 27 and said wheel means being moveable between an operating position perpendicular to said toolbars, an intermediate conversion position disposed at an acute angle to the toolbar opening rearwardly away from the center and a transport position parallel to the toolbars, and control means for said wheels.

29. The invention in accordance with claim 28 and a hobble means for latching the toolbars together in the transport position, said hobble means unlatching in response to the actuation of said wheel control means to change said planter frame from the transport position to the operating position.

* * * * *